Dec. 19, 1922.
M. L. SCHLUETER,
TIRE OR TRACTOR BELT,
FILED MAY 19, 1920.
1,439,484
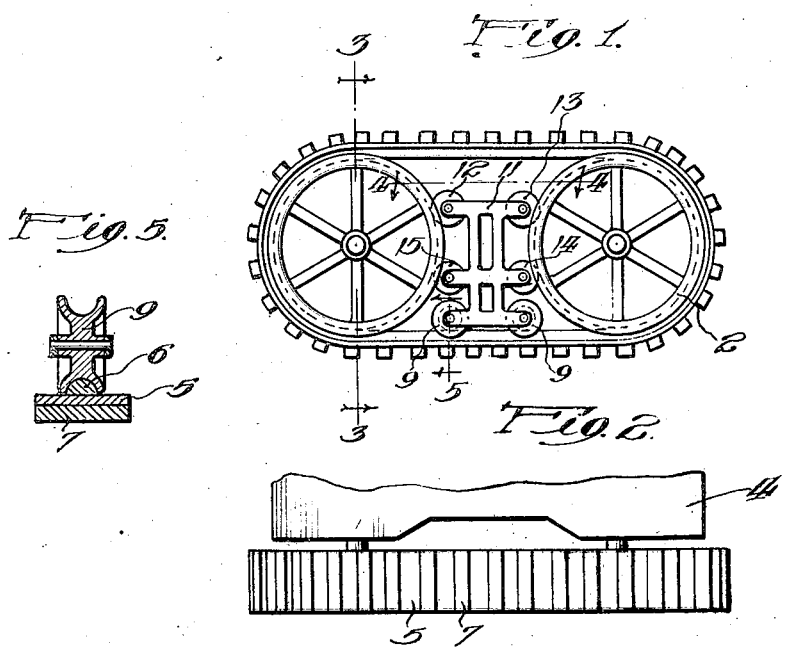
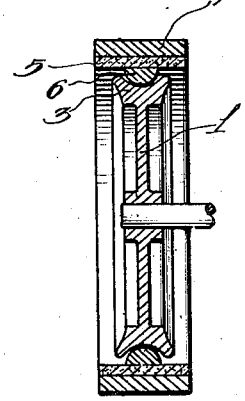
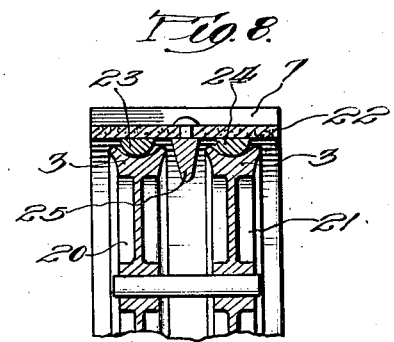
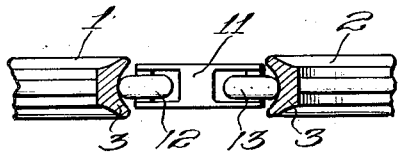
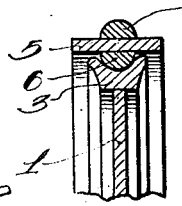
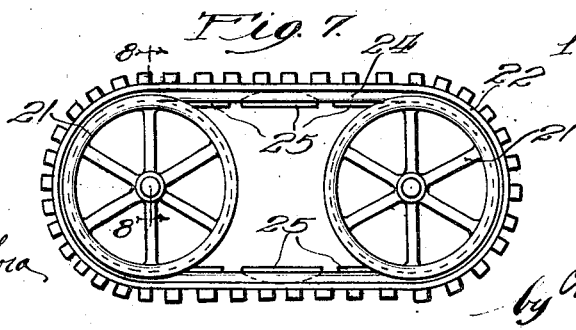

Patented Dec. 19, 1922.

1,439,484

UNITED STATES PATENT OFFICE.

MAX L. SCHLUETER, OF CHICAGO, ILLINOIS.

TIRE OR TRACTOR BELT.

Application filed May 19, 1920. Serial No. 382,633.

*To all whom it may concern:*

Be it known that I, MAX L. SCHLUETER, a citizen of the United States, residing at Chicago, county of Cook, State of Illinois, have invented a certain new and useful Improvement in Tire or Tractor Belts, and declare the following to be a full, clear, and exact description of the same, such as will enable others skilled in the art to which it pertains to make and use the same, reference being had to the accompanying drawings, which form a part of this specification.

My invention has for its object to produce a simple and novel tractor belt for light tractors of the endless belt type, which will serve as an efficient cushion for the load.

The principle of my invention is applicable to single wheels as well as to multiple wheels and therefore, viewed in one of its aspects, my invention may be said to have for its object to produce a simple and novel cushion tire.

The various features of novelty whereby my invention is characterized will hereinafter be pointed out with particularity in the claims; but, for a full understanding of my invention and of its objects and advantages, reference may be had to the following detailed description taken in connection with the accompanying drawing wherein:

Figure 1 is a side view of the traction wheels on one side of a light tractor of the endless belt type, having my invention applied thereto;

Fig. 2 is a top plan view of the parts illustrated in Fig. 1, together with a fragment of the body of the tractor;

Fig. 3 is a section taken approximately on line 3—3 of Fig. 1, on a larger scale than Fig. 1;

Fig. 4 is a section taken approximately on line 4—4 of Fig. 1, the scale being approximately the same as that of Fig. 3;

Fig. 5 is a section on line 5—5 of Fig. 1;

Fig. 6 is a section similar to Fig. 3 showing a modified form which may either be a tractor belt or a tire, only a fragment of the wheel being shown;

Fig. 7 is a view similar to Fig. 1 showing a modification; and

Fig. 8 is a section on line 8—8 of Fig. 7.

Referring to Figs. 1–6 of the drawing, 1 and 2 represent two road wheels of a tractor, the same having comparatively wide rims, 3, the peripheries of which are in the form of shallow troughs. These wheels are associated in any suitable way with a tractor body, 4. Extending around the two wheels is an endless traction device comprising a wide, flat belt, 5, preferably made of rubber and fabric in the manner of so-called rubber belts, power belts, or casing for pneumatic tires. On the inner side of the belt is a rib or projection, 6, extending along the longitudinal center thereof, the same being preferably made of an efficient cushioning material such as rubber. The rib is preferably narrower than the troughs of the rims so that it may rock in the same and expand laterally under a load without welling over the sides of the rims. On the outer side of the belts are transverse cleats, 7, distributed along the same, the cleats being also preferably of a good cushioning material such as rubber.

Instead of the cleats, there may be on the outer side of the belt a rib similar to the rib 6, as indicated at 8 in Fig. 6. With this latter arrangement, the traction device will rest on a narrow tread surface while traveling over hard surfaces but, when soft ground or sand are encountered, the device will sink until the flat belt itself becomes a tread surface. Both forms of tractor devices, particularly that illustrated in Fig. 6, may be used as tires for individual wheels instead of as endless belts.

In the arrangement shown in Fig. 1, the main tractive effort would be directly underneath the axes of the wheels, since the lower run of the belt will yield upwardly unless means are provided for holding it down. In accordance with one feature of my invention, I provide one or more small wheels, 9, having grooved peripheries adapted to fit the rib 6 of the tractor device, this wheel or wheels being supported between the main load-carrying wheels in engagement with the lower run of the tractor device and serving to hold it down against the supporting surface. The wheel or wheels, 9, may be held in place in any suitable way. In the arrangement shown, I have provided a structure for this purpose which is independent of the frame of the tractor but depends wholly for its support on the load-carrying wheels. This structure comprises a frame, 11, having thereon four wheels, 12, 13, 14 and 15, and carrying at its lower end the wheel or wheels, 9. The wheels, 12 to 15, are so located that when the parts are assembled, the wheels 12 and 15 run in the trough of the load-carrying wheel 1, above and below a horizontal plane containing the axes of the latter wheel, while the wheels 13 and 14 bear the same relation to the other load-carrying wheel 2. The frame, 11, can not become displaced laterally because the wheels thereon are interlocked with the load-carrying wheels and the endless tractor device, and it cannot move up or down because of the relations between the wheels 12 to 15 and the load-carrying wheels. It will therefore be seen that the free span of the lower run of the endless tractor device is prevented from rising when it encounters an obstruction, so that the entire lower run of the device becomes an effective tractor element under all conditions.

In Figs. 7 and 8 I have shown an arrangement adapted for severe service. In the arrangement illustrated in these figures, instead of the single wheels 1 and 2, I employ wheels arranged in pairs, 20 and 21, lying beside each other on the same shaft or axle and spaced apart somewhat at their rims. The belt, 22, is made wide enough to extend across both rims of each double wheel and, instead of having a single cushioning rib or projection on the inner or under side, it is provided with two such ribs or projections, 23 and 24, each of which rests in the trough-like rim, 3, of the corresponding wheel. In order to insure that the belt will not jump from the wheels, I provide it with a series of metal vanes, 25, disposed end to end along the longitudinal center; each vane being secured to the belt only at the middle and having the edge which faces the belt curved on the same radius as that of the wheels. The vanes are preferably tapered or wedge-shaped in cross section and are deep enough to extend well down between the rims of each double wheel as they pass around the same. By curving the vanes, as shown, they do not interfere with the free operation of the belt, permitting the latter to curve itself to conform to the wheels and to straighten out along the upper and lower runs between the wheels. By making the vanes tapered or wedge-shaped, they will be guided positively into the space between the two wheels of each pair.

While I have illustrated and described with particularity only a single preferred form of my invention, with slight modifications, I do not desire to be limited to the exact structural details thus illustrated and described; but intend to cover all forms and arrangements which come within the terms employed in the definitions of my invention constituting the appended claims.

I claim:

1. A traction device comprising two wheels having trough-like rims, an endless belt extending around both of said wheels and having on its inner face a central rib of cushioning material deeper than the troughs in the rims extending longitudinally of the same and resting in the trough of the rims, a grooved wheel resting on the rib of the lower run of said belt, and means engaging the two first-mentioned wheels for holding the other wheel against bodily displacement.

2. A traction device comprising two wheels having trough-like rims, an endless belt extending around both of said wheels and having on its inner face a central rib of cushioning material extending longitudinally of the same and resting in the trough of the rims, a grooved wheel resting on the rib of the lower run of said belt, a frame for supporting the last-mentioned wheel, and rolling elements on said frame engaging with each of the other wheels both above and below a plane containing the axes of the latter.

In testimony whereof, I sign this specification.

MAX L. SCHLUETER.